(12) United States Patent
Deichsel et al.

(10) Patent No.: US 6,560,268 B1
(45) Date of Patent: May 6, 2003

(54) RESONATOR MIRROR WITH A SATURABLE ABSORBER

(75) Inventors: Eckard Deichsel, Heidenheim (DE); Roland Jaeger, Ulm (DE); Peter Unger, Ulm (DE)

(73) Assignee: LDT GmbH & Co. Laser-Display-Technologie KG, Gera (DE)

( * ) Notice: Subject to any disclaimer, the term of this patent is extended or adjusted under 35 U.S.C. 154(b) by 206 days.

(21) Appl. No.: 09/624,633

(22) Filed: Jul. 24, 2000

(30) Foreign Application Priority Data

Jul. 23, 1999 (DE) .......................... 199 34 639

(51) Int. Cl.$^7$ ................................. H01S 3/08
(52) U.S. Cl. ............................. 372/99; 372/11
(58) Field of Search ............................. 372/99, 10, 11, 372/92, 96

(56) References Cited

U.S. PATENT DOCUMENTS 5,502,737 A * 3/1996 Chartier et al. ............... 372/11
6,141,359 A * 10/2000 Cunnungham et al. ....... 372/18

FOREIGN PATENT DOCUMENTS

| EP | 0 732 613 | 9/1996 |
| EP | 0 805 529 A2 | 11/1997 |
| WO | WO 96/36906 | 11/1996 |

OTHER PUBLICATIONS

W. H. Loh et al., "Passively Mode–Locked Er$^{3x}$ Fiber Laser Using A Semiconductor Nonlinear Mirror", IEEE Photonics Technology Letters, Jan. 1993, vol. 5, No. 1, pp. 35–37.
XP 000627765 / Diode–Pumped Passively Mode–Locked 1.3–$\mu$m Nd:YVO$_4$ and Nd:YLF Lasers By Use Of Semiconductor Saturable Absorbers; Fluck, et al. 1996.
XP 000689812 / Semiconductor Saturable Absorber Mirrors (SESAM's) for Femtosecond to Nanosecond Pulse Generation in Solid–State Lasers; Keller, et al. 1996.
XP 000691331 / Broadly Tunable Femtosecond Cr:LiSAF Laser; Kopf, et al 1997.
XP 000724499 / Femtosecond Cr:Forsterile Laser with Mode Locking Initiated by a Quantum–Well Saturable Absorber; Zhang, et al. 1997.
XP 000735433 / Spectral Characteristics of an InP/InGaAs Distributed Absorbing Bragg Reflector; Ogawa, et al. 1998.
Organometallic Vapor Phase Epitaxy of High–Performance Strained–Layer InGaAs–AIGaAs Diode Lasers; Wang, et al. 1991.
Femtosecond Yb:YAG Laser Using Semiconductor Saturable Absorbers; Hoenninger, et al. 1995.
Design and Operation of Antiresonant Fabry–Perot Saturable Semiconductor Absorbers for Mode–Locked Solid State Lasers; Brovelli, et al. 1995.
Self–Staring Mode–Locked Femtosecond Forsterite laser with a Semiconductor Saturable–Absorber Mirror; Zhang 1997.
Broadband Semiconductor Saturable–Absorber Mirror for a Self–Starting Mode–Locked Cr:forsterite Laser; Zhang 1998.

* cited by examiner

Primary Examiner—James Davie
(74) Attorney, Agent, or Firm—Reed Smith LLP

(57) ABSTRACT

A resonator mirror with a saturable absorber for a laser wavelength $\lambda_L$ formed of a series of layers of a plurality of semiconductor layers on a substrate, wherein a Bragg reflector formed of a plurality of alternately arranged layers comprising a first material with an index of refraction $n_H$ and a second material with a lower index of refraction $N_L$ compared with the latter is grown on a surface of the substrate. It is characterized in that a threefold layer is grown on the Bragg reflector, wherein a single quantum layer is embedded within two layers outside an intensity minimum for the laser radiation $\lambda_L$ and the threefold layer has a combined optical thickness of $$\frac{\lambda_L}{2}.$$

17 Claims, 4 Drawing Sheets

RESONATOR MIRROR WITH A SATURABLE ABSORBER

BACKGROUND OF THE INVENTION a) Field of the Invention

The invention is directed to a resonator mirror with a saturable absorber which is formed of a plurality of semiconductor layers on a substrate for use in a solid-state laser resonator.

b) Description of the Related Art

WO 96/36906 A1 describes optical components for generating pulsed laser radiation which can be used as a resonator mirror. These resonator mirrors contain a stack or layer construction having a reflector and a saturable absorber. The position of the absorber layer in an ensemble of layers is utilized to compensate for the wavelength dependence based on the structure of the ensemble of coatings with the absorption given by the absorbing material for a given wavelength range (page 8, lines 29–35). It can be gathered from FIG. 3 and the accompanying description that this step should make it possible to maintain a reflectivity of almost 100% over a wavelength range of approximately 50 nm.

Further, a negative dispersion of the group velocity of the radiation waves in the laser resonator is to be achieved with the layer construction (page 11, lines 1–3). The aim of the arrangement of the saturable absorber within the layer construction is to integrate the characteristic of saturable absorption in the layer construction in an optimal manner in addition to the characteristic of a negative dispersion (page 11, lines 19–27). The curve of the intensity inside the ensemble of coatings is shown in FIG. 4 for four wavelengths within a wavelength range of 40 nm. It can be gathered from FIG. 8 and the accompanying description that the reflectivity of the optical components can be adjusted by means of the position of the saturable absorber in the ensemble of coatings.

Further, claim 4 states that the saturable absorber is arranged at a location where there is a high radiation intensity change and a high absorption change in a wavelength range. Therefore, a predetermined reflection curve is to be provided within a wavelength range in cooperation with the other layers (see claim 5). A uniformly high reflection factor is to be achieved over a wavelength range of 50 nm (FIGS. 3, 8a–e). An optimization criterion is to maintain an optimal saturably absorbing effect of these optical components. It can be gathered from the description that the optimum (page 11, lines 33 to 37) consists in maintaining laser pulses with extremely short pulse widths (less than 10 fs) and/or (page 15, lines 10 to 16) that the saturable absorber is placed at a location where the desired effect occurs: to maintain the desired broad band with respect to a desired wavelength range.

OBJECT AND SUMMARY OF THE INVENTION

It is the primary object of the present invention to provide a resonator mirror of comparatively simple construction with a saturable absorber for use in a solid-state laser resonator that can be highly loaded with respect to power. The saturable absorber should generate laser pulses with a width in the range of 0.1 to 100 ps, wherein a predetermined peak output should be maintained as constant as possible.

The invention relates to a resonator mirror with a saturable absorber for a laser wavelength $\lambda_L$ which is formed of a layer sequence of a plurality of semiconductor layers on a substrate, wherein a Bragg reflector formed of a plurality of alternately arranged layers comprising a first material with an index of refraction $n_H$ and a second material with a lower index of refraction $N_L$ is grown on a surface of the substrate. The resonator mirror is provided for use in a mode-synchronized solid-state laser resonator with an output power greater than 1 W, especially greater than 7 W.

According to the invention, the resonator mirror with a saturable absorber comprises the Bragg reflector grown on a substrate and a threefold layer which is grown on the latter and which acts as a saturable absorber for the laser wavelength $\lambda_L$, wherein a single quantum layer is embedded within two layers outside an intensity minimum for the laser radiation $\lambda_L$ and the threefold layer has a combined optical thickness of $$\frac{\lambda_L}{2}.$$

The refractive indices of the respective materials for the laser wavelength $\lambda_L$ are taken into account for determining the layer thickness of the single quantum layer, the two layers between which the latter is embedded, and the first and second layers for the Bragg reflector. The optical thickness is given by the air wavelength divided by the index of refraction n of the corresponding layer for the laser wavelength $\lambda_L$. In this connection, the refractive indices of the two layers enclosing the single quantum layer are not critical and can also be different for each of the two layers. It is important to maintain the total optical thickness $$\frac{\lambda_L}{2}$$

of the threefold layer. The selection of materials for the threefold layer is therefore governed in particular by the material properties of the Bragg reflector, especially by the grating constants of the utilized materials which should be identical as far as possible. Identical grating constants allow a monocrystalline growth of the layers on a monocrystalline substrate with as few defects as possible. Monocrystalline layer systems are particularly advantageous because they have an especially small absorption. The selection of material for the single quantum layer and its thickness depends, in turn, on its saturably absorbing properties (band gap) for the laser wavelength and is not limited to the materials mentioned herein. Above all, the two layers must have a low absorption for laser wavelength $\lambda_L$ and the property that they produce a permanent fixed connection with the single quantum layer and the layer system of the Bragg reflector.

The threefold layer will be referred to hereinafter as the layer having the saturably absorbing effect; only the single quantum layer with its band gap is the actual absorbing layer, but it is only capable of functioning due to the fact that it is embedded within the threefold layer in the manner described in the following.

In the present case, the single quantum layer is not subject to any resonance condition within a laser resonator. Its function is comparable with that of a dye absorber in a dye laser or solid-state laser. It must be stressed that ultra-short pulses in the femtosecond and milliwatt range which are desirable in communications technology should not be generated in this case. In practice, the resonator mirror is designed in such a way that a given high reflection factor for the laser wavelength $\lambda_L$ is achieved with the smallest possible number of alternating individual layers, wherein a reflection factor of 98% is generally sufficient for laser operation. Including the threefold layer as saturable absorber, for example, only about 30 individual layers are required for a reflector with a saturably absorbing effect. This comparatively small number of individual layers requires a correspondingly low expenditure on manufacturing. What is more important, however, is that the comparatively small number of individual layers in combination with a corresponding control and management of the coating process leads to a very homogeneous layer construction vertical to the radiation direction of the laser light. This, in turn, enables the use of a comparatively slight focusing of the laser beam on the resonator mirror. The spot diameter on the resonator mirror can be more than 200 µm in this case and can be expanded to approximately 5 mm, wherein a neat, constant mode synchronization of the laser is effected. These comparatively large spot diameters substantially reduce the power density at the resonator mirror. Typical values range from less than 100 kW/cm² to about 2 kW/cm² with respect to CW operation of the laser. However, in practice, operation is performed as close as possible to the load limit of the resonator mirror in order to achieve a maximum laser output power over a given lifetime of the laser radiation source.

The invention makes possible a comparatively simple, manageable calculation of a resonator mirror with a saturable absorber since it is based on the function of the individual components, the Bragg reflector and saturable absorber. The selection of the position of the single quantum layer within the threefold layer affords a simple possibility for influencing within wide limits the stability of a resonator mirror of this kind with respect to radiation.

Further, a comparatively simple process control also results for the layer construction by means of appropriate processes in thin-film technique, wherein the use of epitaxially grown layers is preferred at the present time.

The threefold layer can also have an optical thickness that is a whole-number multiple i of $$\frac{\lambda_L}{2},$$

wherein the advantages of the invention are retained. The threefold layer which is thicker by the factor i is required for protection of the single quantum layer primarily because of an improved surface passivization, where the selected value for i, generally 2 or 3, is sufficient.

The absorption behavior of the resonator mirror with the saturable absorber is adjusted by the selection of the thickness $d_3$ of the single quantum layer and its position between the two layers, wherein one of the two layers has a minimum thickness of $$\frac{\lambda_L}{100}.$$

This minimum thickness should be greater than the thickness of the single quantum layer in every case. The single quantum layer must be located at a sufficient distance from the standing wave minimum and be adequately protected mechanically and chemically from adjoining media.

The absorption behavior of the single quantum layer essentially determines the pulse duration of a mode-synchronized laser in which this resonator mirror is used. The position of the single quantum layer within the two layers is determined according to the criterion of the desired or required stability of the resonator mirror with respect to lasers, wherein this position must be located far enough away from the standing wave minimum of the laser radiation so that the required saturably absorbing effect is retained in order to generate short laser pulses, e.g., in the picosecond range. The absorption behavior and therefore the pulse duration generated in a laser are adjustable in an especially favorable and reproducible manner through the selection of the position of the single quantum layer between the two enclosing layers inside the threefold layer. The pulse duration and absorption behavior in turn determine the power stability of the resonator mirror, wherein it is expected that longer pulses increase the power stability of the resonator mirror.

However, it has been shown that the characteristics and working parameters of the resonator mirror with the saturable absorber are highly dependent upon the respective installation conditions within a laser resonator (resonator design).

An advantage resulting from the invention consists in that the resonator mirror with the saturable absorber is optimized in cooperation with the laser resonator with respect to the specific requirements of the user by means of a simple, manageable step: the placement of the single quantum layer inside the threefold layer.

In practice, the following procedure is carried out: First, a resonator geometry is planned which contains at least the laser crystal, an output-coupling mirror and the resonator mirror (see Köcher, W., Solid-State Laser Engineering, Vol. 1, Edition 4, Berlin, Springer Verlag 1996). With knowledge of the teaching according to the invention, few experiments in which the position of the single quantum layer inside the threefold layer is varied are necessary to determine the pulse durations and laser stabilities at different laser output powers. For a specific construction of a laser resonator, dependencies are determined and utilized for optimizing the position of the single quantum layer inside the threefold layer.

Experiments with a resonator design have shown that the shortest pulse lengths were achieved when the single quantum layer is arranged in the standing wave maximum of the laser radiation. However, the relatively low power stability of the resonator mirror was also determined in this position.

The single quantum layer is therefore preferably arranged outside an intensity maximum of the laser radiation. In practice, the invention utilizes a position of the single quantum layer inside the threefold layer between the standing wave maximum and the standing wave minimum of the laser radiation. With this dimensioning, an increase in the pulse duration was observed; however, this pulse duration can be further reduced through additional steps to be named hereinafter, so that sufficiently short pulses of the laser radiation in the picosecond range and a sufficient laser stability of the resonator mirror in the CW watt range are achieved.

A reduction in the pulse duration of the laser radiation is achieved by an anti-reflection coating which is applied to the threefold layer and which is designed for a laser wavelength $\lambda_L$. A further increase in the power stability of the resonator mirror is also achieved by means of the anti-reflection coating. The operation of the saturable absorber is neither resonant nor anti-resonant as a result of this anti-reflection coating.

Further, the pulse duration of the laser radiation is decreased in that the single quantum layer is applied as a low-temperature layer, wherein the pulse duration decreases as the selected growth temperature is reduced. In particular, the single quantum layer comprises one of the following material systems: indium gallium arsenide (InGaAs) or gallium arsenide antimony (GaAsSb) or gallium nitrogen arsenide (GaNAs).

For minimizing expenditure for the production of the resonator mirror with the saturable absorber, it is particularly advantageous when one of the materials used to construct the Bragg reflector is also used to construct the threefold layer. Layers of identical or structurally very similar materials are grown on one another epitaxially in a particularly favorable manner. The materials for the production of the Bragg reflector are especially suitable for this purpose. In this case, the threefold layer advantageously comprises a layer of the first material or of the second material of the Bragg reflector, a single quantum layer and a further layer comprising the first material or second material of the Bragg reflector. The single quantum layer, whose thickness $d_3$ depends on the laser wavelength $\lambda_L$, is embedded between two layers of the first material with the index of refraction $n_H$ or between two layers of the second material with the index of refraction $n_L$, wherein these layers with their thickness $d_1$, $d_2$ and $d_3$ form the threefold layer which has a thickness of $$\frac{\lambda_L}{2*n_H} \text{ or } \frac{\lambda_L}{2*n_L}.$$

The anti-reflection coating is also advantageous in this case, wherein its index of refraction is designed according to $\sqrt{n_H}$ or $\sqrt{n_L}$ and the anti-reflection coating has a thickness of $$\frac{\lambda_L}{4*\sqrt{n_H}} \text{ or } \frac{\lambda_L}{4*\sqrt{n_L}},$$

depending on the adjoining material.

To increase the laser strength of the resonator mirror, the latter is fastened to a heat sink by its substrate. This has the purpose of ensuring a constant operating temperature of the saturable absorber, wherein a fine matching of the saturably absorbing layer to the respective laser wavelength $\lambda_L$ is carried out by adjusting the reference temperature. This heat sink also ensures the required high constancy of the peak output over time.

An advantageous arrangement of this procedure consists in that the substrate is made of gallium arsenide (GaAs) and the Bragg reflector comprises individual layers, each of which has a thickness of $$\frac{\lambda}{4*n_{GaAs}}$$

for the first material with the refractive index $n_H$ with undoped gallium arsenide (GaAs) and $$\frac{\lambda_L}{4*n_{AlAs}}$$

for the second material with the lower refractive index $n_L$ with undoped aluminum arsenide (AlAs), and the single quantum-layer comprises indium-gallium arsenide (In$_{1-x}$Ga$_x$As). The Bragg reflector comprises 15 to 50 individual layers which form mirror pairs. The number of mirror pairs determines its reflectivity factor (see Orazio Svelto, "Principles of Lasers", 4th edition, Plenum Press 1998). For example, a reflectivity of the resonator mirror of over 98% is achieved with 28 mirror pairs. In practice, it is always attempted to work with as few layers as possible. The characteristics of the material system comprising gallium arsenide/aluminum arsenide have been investigated to a sufficient extent that these materials can be epitaxially grown on the substrate of gallium arsenide in a comparatively simple manner with the required homogeneity of layer thicknesses and layer construction.

The dimensioning of the single quantum layer of indium gallium arsenide (In$_{1-x}$Ga$_x$As) for the respective laser wavelength is known from the literature (see, e.g., Wang, C. A., Hong, K.Ch., "Organometallic Vapor Phase Epitaxy of High-Performance Strained-Layer InGaAs-AlGaAs Diode Lasers", IEEE Journal of Quantum Electronics, Vol. 27, No. 3, March 1991). For a laser wavelength of 1064 nm, the thickness of the single quantum layer is about 7 nm and the gallium proportion x=67%.

The single quantum layer is embedded in two gallium arsenide layers, wherein these layers, together, must have the corresponding $\lambda/2$ thickness. In practice, the layer construction is carried out in such a way that an interference-free layer construction and a technologically more favorable process run are ensured.

The absorption behavior and accordingly the pulse duration generated in a laser are adjustable in a particularly favorable and reproducible manner through the selection of the position of the indium-gallium-arsenide single quantum layer between the two gallium arsenide layers inside the threefold layer. The pulse duration and absorption behavior in turn determine the power stability of the resonator mirror. One of the gallium arsenide layers arranged inside the threefold layer acting as saturable absorber has a minimum thickness of about $$\frac{\lambda_L}{100}.$$

This minimum thickness is required so that the indium gallium arsenide layer functions as an absorbing single quantum layer and so that this layer, which is very sensitive to environmental influences, is adequately protected.

The gallium arsenide layer facing away from the Bragg reflector accordingly always serves as a protective layer for the indium gallium arsenide layer relative to the surrounding medium. In a special case, the indium gallium arsenide layer is embedded within two gallium arsenide layers with an optical thickness of $\lambda_L/4$. In this case, the indium gallium arsenide layer is located exactly in the standing wave maximum. This has the disadvantage of a maximum energy density at this location. However, this disadvantage is overcome in that the diameter of the beam bundle entering the resonator mirror is adjusted so as to be comparatively large; instead of a spot diameter of 10 $\mu$m, spot diameters greater than 200 $\mu$m can be adjusted. However, this is only possible in a very homogeneous layer construction which is benefited by the comparatively very simple layer construction and the comparatively small number of individual layers.

The indium gallium arsenide layer is advantageously a low-temperature layer. The growth temperature should be under 500° C. in order to generate sufficiently short laser pulses. However, the aim of the present invention is not the generation of the shortest possible laser pulses as is desirable for applications in communications technology.

However, a low-temperature layer ensures that the saturable absorber also delivers sufficiently short laser pulses with an optimization of the layer construction with respect to its power stability which are advantageously in the range of 1 to 10 picoseconds for many technical applications. Examples of technical applications are materials processing or image projection by means of laser light.

The influence of the pulse duration of the laser light on image generation is described, for example, in WO 98/20385. It is stated therein that the so-called speckle phenomena can no longer be perceived by an observer when images are generated by laser light with a pulse duration in the picosecond range.

As was already described in general, an anti-reflection coating is advantageously applied to the outer gallium arsenide layer remote of the reflector. The anti-reflection coating is designed for a laser wavelength $\lambda_L$, wherein its index of refraction is calculated according to $\sqrt{n_{GaAs}}$ and used with $n_{GaAs}$ for laser wavelength $\lambda_L$. A reflection factor of less than 1% can be achieved without great effort and the calculated index of refraction need only be achieved approximately. The optical thickness of the anti-reflection coating is $\lambda_L/4$.

For laser wavelength $\lambda_L$=1064 nm, the anti-reflection coating is produced from a layer of silicone oxinitride or from a layer of silicone nitride. The anti-reflection coating delivers a higher intensity in the single quantum layer. With an anti-reflection coating on the resonator mirror with the saturable absorber, comparatively shorter pulse durations were measured.

A further advantageous arrangement of the invention consists in that the substrate is formed of indium phosphide (InP) and the Bragg reflector is formed of individual layers, each of which has a thickness of $$\frac{\lambda_L}{4*n_{InGaAs}}$$

for the first material with the refractive index $n_H$ with indium gallium arsenide (In$_{1-y}$Ga$_y$As) and $$\frac{\lambda_L}{4*n_{InP}}$$

for the second material with the lower refractive index $n_L$ with indium phosphide (InP).

The single quantum layer also comprises indium gallium arsenide (In$_{1-x}$Ga$_x$As), wherein its layer thickness is in the range of 6 nm to 10 nm and its composition (x) is determined by the laser wavelength $\lambda_L$. In this case, also, the gallium proportion (x) determines the size of the band gap. The Bragg reflector in this case comprises 30 to 100 individual layers. The gallium proportion y is 47% in the indium gallium arsenide layers of the Bragg reflector in order to maintain the grating matching with the indium phosphide layers. This resonator mirror is suitable for laser wavelengths $\lambda_L$ greater than 1.65 μm.

In the present case, the single quantum layer is embedded between two layers of indium gallium arsenide or between two layers of indium phosphide.

A further advantageous arrangement of the invention consists in that the substrate comprises indium phosphide (InP) and the Bragg reflector comprises individual layers, each of which has a thickness of $$\frac{\lambda_L}{4*n_{InGaAsP}}$$

for the first material with the refractive index $n_H$ with indium gallium phosphide (In$_{1-y}$Ga$_y$As$_z$P$_{1-z}$) and $$\frac{\lambda_L}{4*n_{InP}}$$

for the second material with the lower refractive index $n_L$ with indium phosphide (InP), and the single quantum layer comprises indium gallium arsenide (In$_{1-x}$Ga$_x$As), wherein its layer thickness and composition are determined by the laser wavelength $\lambda_L$. In particular, the gallium proportion y and the arsenide proportion z are determined by the relationship y=0.4z+0.067z$^2$ in order to achieve the grating matching between the indium gallium arsenide phosphide layers (In$_{1-y}$Ga$_y$As$_z$P$_{1-z}$) and the indium phosphide layers (InP) of the Bragg reflector. Depending on the gallium proportion, this resonator mirror is suitable for laser wavelengths $\lambda_L$ greater than 1.3 μm. However, since the difference in the index of refraction in the layer construction of the Bragg reflector is comparatively slight, more mirror pairs must be used in this case to achieve an equal reflectivity. Typically, 40 to 100 mirror pairs are necessary for functioning in a laser resonator.

In this case, as well, the single quantum layer is embedded between two layers of indium gallium arsenide phosphide or between two layers of indium phosphide.

The invention is described in the following with reference to drawings.

DESCRIPTION OF THE PREFERRED EMBODIMENTS

Figure 1:
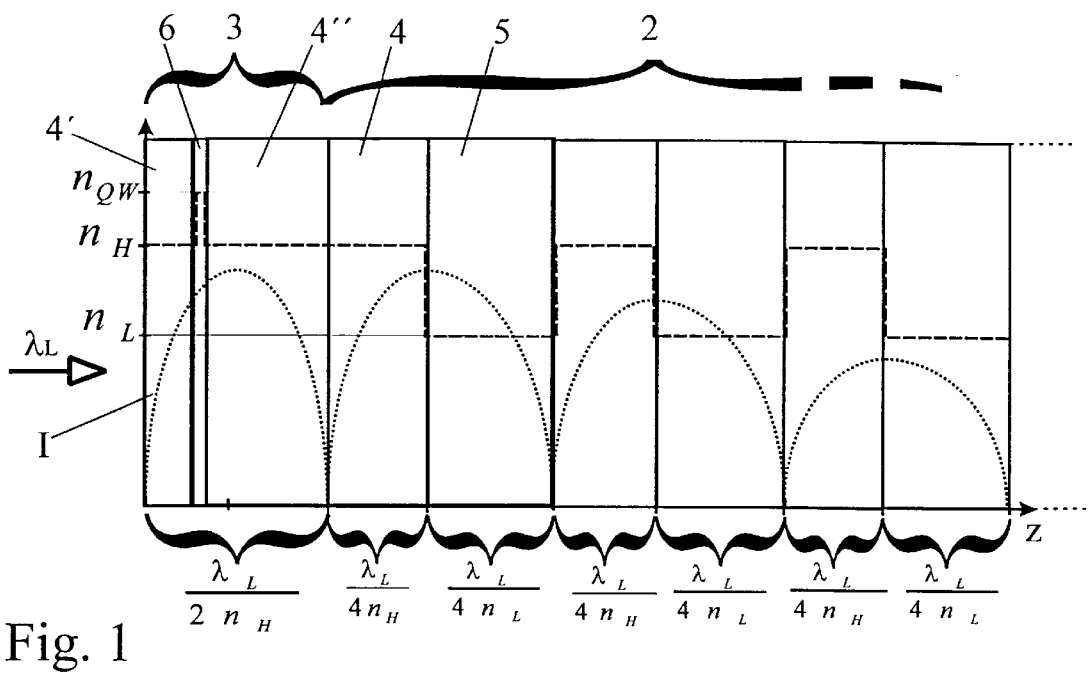
FIG. 1 is a schematic view of the construction of the resonator mirror with a single quantum layer inside high-index layers.

FIG. 1 shows the schematic layer construction of a resonator mirror with a single quantum layer 6 which is arranged between two high-index layers 4' and 4" along a coordinate z. A plurality of layer pairs made from a material 4 with a higher index of refraction $n_H$ and a material 5 with a lower index of refraction $n_L$ are constructed on a substrate (not shown here) and form a Bragg reflector 2. The thickness of the individual layers given by the indices of refraction of the materials 4 and 5 for the respective laser wavelength $\lambda_L$ are $$\frac{\lambda_L}{4*n_H} \text{ and } \frac{\lambda_L}{4*n_L}.$$

Considered in the direction of the laser radiation $\lambda_L$ entering the resonator mirror, a threefold layer 3 is applied as saturable absorber to the first layer of material 4 with the high index of refraction $n_H$ of the Bragg reflector 2. This threefold layer 3 contains the single quantum layer 6. This single quantum layer 6 is embedded between the two layers 4' and 4" with the high index of refraction $n_H$, wherein the total thickness of the threefold layer 6 is given by $$\frac{\lambda_L}{2*n_H}.$$

The layers 4' and 4" should be made from the same material, but need not be identical with the material 4 with the high index of refraction.

The material composition and the thickness of the single quantum layer 6 are determined corresponding to its saturably absorbing action for the laser wavelength. The thicknesses of these enveloping layers 4' and 4" are adjusted in such a way that a total thickness of the threefold layer is $$\frac{\lambda_L}{2*n_H}$$

Figure 2:
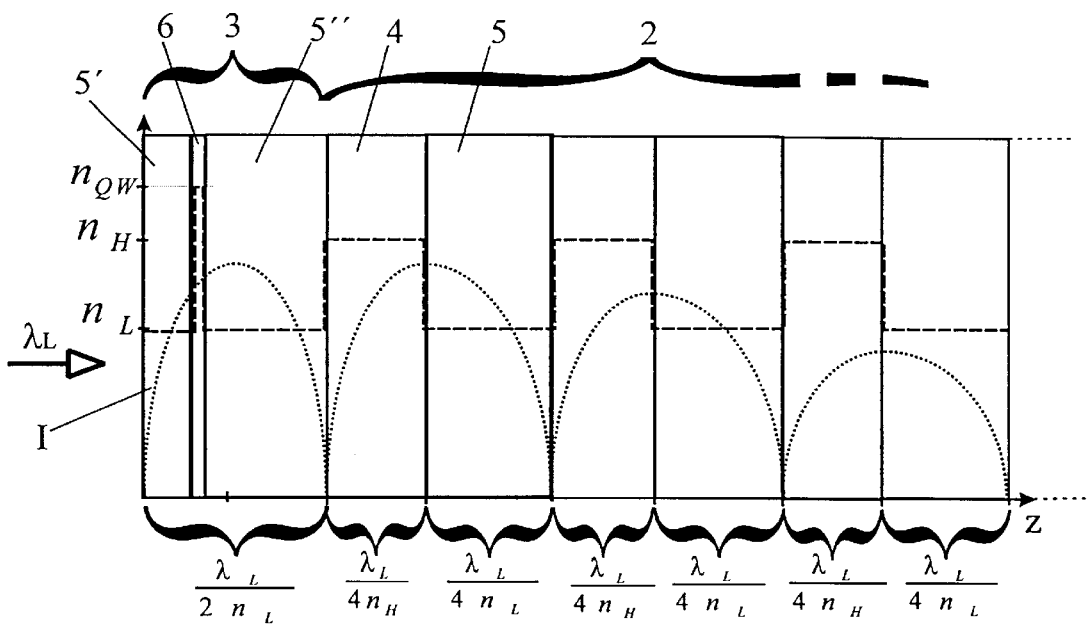
FIG. 2 is a schematic view of the construction of the resonator mirror with a single quantum layer inside low-index layers.
Figure 3:
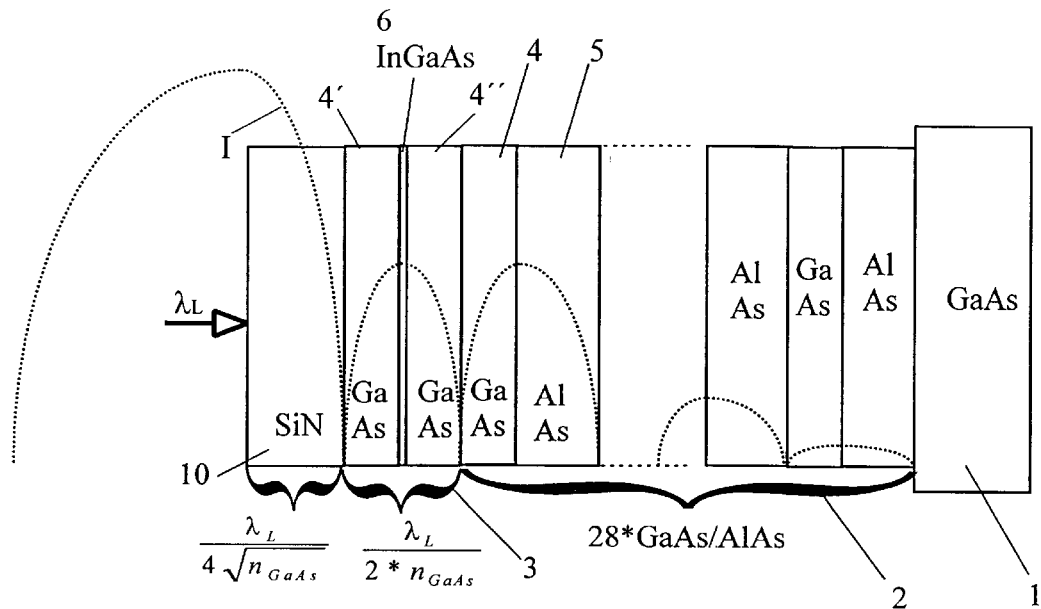
FIG. 3 shows the construction of the resonator mirror with a saturable absorber based on a GaAs/AlAs system.
Figure 4:
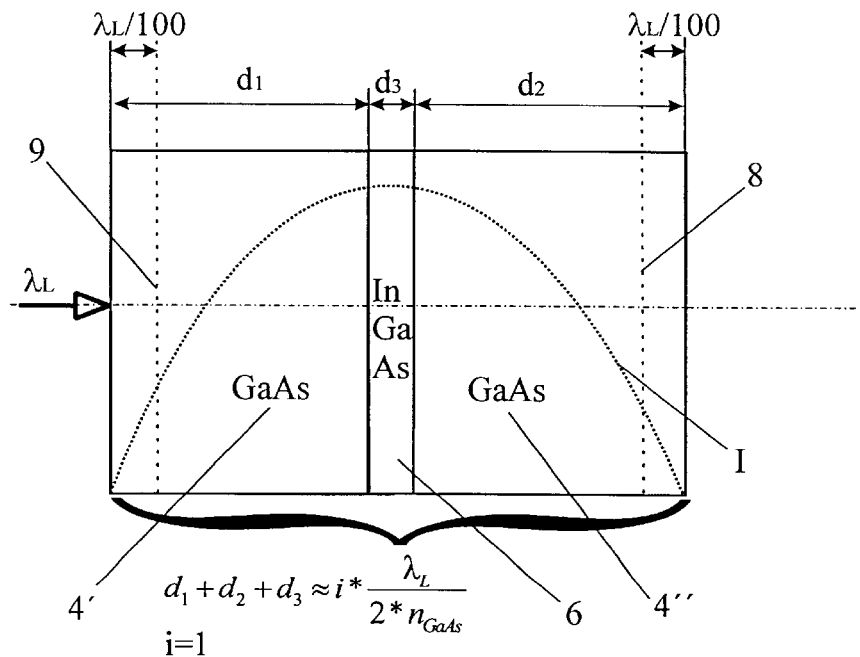
FIG. 4 shows the position of a single quantum layer inside a threefold layer according to FIG. 3 acting as a saturable absorber.

(see also the statements relating to the example in FIG. 3 and FIG. 4). The index of refraction $n_{QW}$ of the single quantum layer 6 is of secondary importance for the functioning of the saturable absorber. However, the location of the single quantum layer 6 inside the threefold layer 3 is important for the functioning of the single quantum layer 6 with saturably absorbing action for generating short laser pulses. In connection with the Bragg reflector which is arranged downstream considered in the direction z of the incident laser radiation $\lambda_L$, an intensity distribution I in the resonator mirror results as is shown schematically in FIGS. 1 to 7 by dotted lines. The dashed lines in FIG. 1 and FIG. 2 show the curve of the index of refraction in the layer system of the resonator mirror schematically.

FIG. 2 shows the schematic layer construction of a resonator mirror with a single quantum layer which is arranged between the two layers 5' and 5" with a low index of refraction. A plurality of layer pairs made from material 4 with a higher index of refraction $n_H$ and material 5 with a lower index of refraction $n_L$ are constructed on a substrate (not shown here) and form the Bragg reflector 2. Considered in the direction of the laser radiation $\lambda_L$ entering the resonator mirror, the threefold layer 3 is applied as saturable absorber to the first layer of material 4 with the high index of refraction $n_H$ of the Bragg reflector 2. This threefold layer 3 contains the single quantum layer 6. This single quantum layer 6 is embedded between two layers 5' and 5" with the low index of refraction $n_L$, wherein the total thickness of the threefold layer 3 is given by $$\frac{\lambda_L}{2*n_L}.$$

The remarks relating to FIG. 1 also apply in an analogous manner to FIG. 2.

FIG. 3 shows the layer construction of a resonator mirror with a saturable absorber in the material system comprising gallium arsenide/aluminum arsenide. Twenty-eight layer pairs of undoped aluminum arsenide (material with low index of refraction 5) and undoped gallium arsenide (material with high index of refraction 4) are applied to a substrate 1 of gallium arsenide and form the Bragg reflector 2 which is designed for laser wavelength $\lambda_L=1064$ nm and reflects the latter at 98.77%.

The calculation of the Bragg reflector can be carried out according to Orazio Svelto, "Principles of Lasers", Plenum Press, 4th edition 1998. The layer thicknesses of the individual layers for gallium arsenide are $$\frac{\lambda_L}{4*n_{GaAs}}$$

with 76 nm and for aluminum arsenide are $$\frac{\lambda_L}{4*n_{AlAs}}$$

with 90 nm. Considered in the direction of the laser radiation $\lambda_L$ entering the resonator mirror, a threefold layer 3 is applied as saturable absorber to the first layer of gallium arsenide of the Bragg reflector 2.

FIG. 4 shows this threefold layer 3. It contains a single quantum layer 6 comprising an indium gallium arsenide layer with a thickness $d_3$ of 7 nm. This is embedded between one of the two gallium arsenide layers (material with high index of refraction 4' and 4"). The thickness of this threefold layer 3 is calculated according to the following formula:

$$d_{ges} = d_1 + d_2 + d_3 = \frac{\lambda_L}{2*n_{GaAs}} - d_3\left(\frac{n_{QW}}{n_{GaAs}} - 1\right),$$

where $d_1$ and $d_2$ are the layer thicknesses of the gallium arsenide layers (material 4' and 4"), $d_3=7$ nm is the thickness of the single quantum layer 6 and the index of refraction $n_{QW}$ of the single quantum layer of indium gallium arsenide was determined empirically with 3.6. The calculation gives an exact thickness of the threefold layer 3 at 152.1 nm. Calculation with the approximation $$d_{ges} = \frac{\lambda_L}{2*n_{GaAs}}$$

gives a value of 152.3 nm. It will be seen from the quantity of the difference of 0.2 nm that the approximation is valid and results are achieved which are sufficient in practice. Therefore, this is particularly important, since the growth process is reliably controlled only with a reproducibility in the nanometer range. These considerations also apply in general in connection with the essential features of the invention.

These two gallium arsenide layers (4' and 4") have a combined thickness of $d_1+d_2=145$ nm. Together with the thickness of the single quantum layer $d_3$, they form a single $\lambda/2$-layer (where i=1) with the thickness $d_{ges}=d_1+d_2+d_3=152$ nm.

According to the invention, the indium gallium arsenide layer (6) inside the gallium arsenide layers (4' and 4") enclosing it is positioned in such a way that, on the one hand, the desired saturably absorbing effect for the mode synchronization inside a laser cavity is achieved and, on the other hand, a power stability limit of the indium gallium arsenide layer (6) is not exceeded. A silicon nitride layer (SiN) of appropriate thickness is used in this case as an anti-reflection layer 10.

In the example according to FIG. 4, the indium gallium arsenide layer (6) with a thickness of 7 nm is arranged in the middle between the two gallium arsenide layers (4' and 4"), each having a thickness of 73 nm, in the intensity maximum. This position is selected, if permitted by the design of the laser resonator, with a desired high output power to generate a sufficiently large spot on the resonator mirror which is dimensioned in such a way that the energy density on the resonator mirror with the saturable absorber is safely below the destruction threshold.

The single quantum layer 6 can now be displaced, according to the invention, in the direction of the laser radiation to a limit 8 or in the direction opposite to that of the laser radiation to a limit 9 in the process of producing the threefold layer 3. These limits are in the order of magnitude of 10 nm with a thickness of about $$\frac{\lambda_L}{100}$$

at laser wavelength 1064 nm. In practice, the limits 9 and 10 are given by the minimum thickness of the gallium arsenide layer required to make the single quantum layer act as a saturable absorber. A sufficient energy density must be effective in the single quantum layer 4 in order to bring it to a sufficient saturation so that the desired saturably absorbing effect occurs. The optimum location for embedding the single quantum layer inside the threefold layer 3 can ultimately only be determined in the concrete arrangement in the laser resonator with its respective dimensioning.

Figure 5:
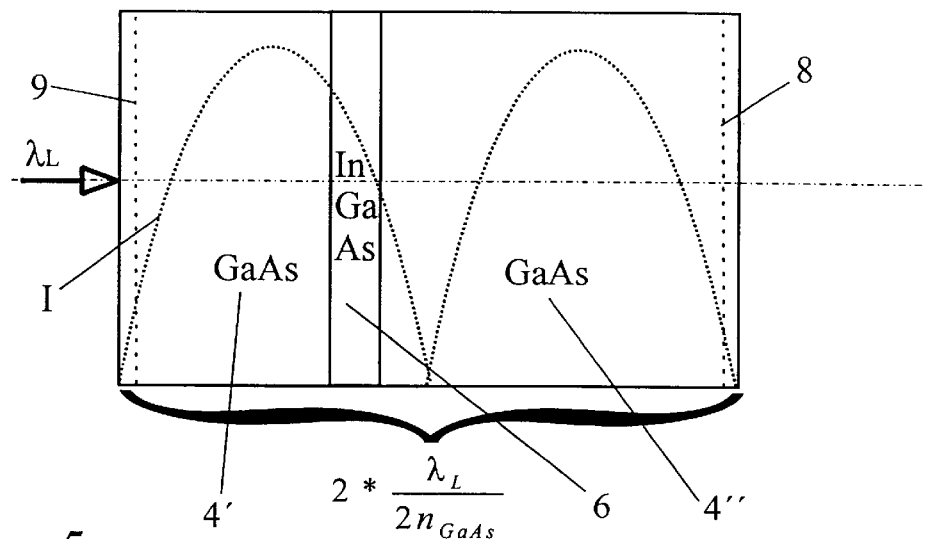
FIG. 5 shows another position of a single quantum layer inside a threefold layer according to FIG. 3 acting as a saturable absorber.

FIG. 5 shows an example in which the single quantum layer 4 with a thickness of 7 nm lies within two gallium arsenide layers (4' and 4"), wherein the threefold layer 3 has a thickness of 304 nm. In the formula $$1 * \frac{\lambda_L}{2 * n_{GaAs}},$$

the value of 2 is selected for i. In this case, the single quantum layer is arranged in an area in which the intensity of the laser radiation is about half of the intensity maximum. The first gallium arsenide layer (4') in the direction of the laser radiation has a thickness of 80 nm and the gallium arsenide layer (4") arranged after the single quantum layer 6 in the direction of the laser light has a thickness of 217 nm. In connection with the Bragg reflector arranged downstream in the direction of the laser radiation, there is an intensity distribution I as is shown by the dotted line in FIG. 5.

Figure 6:
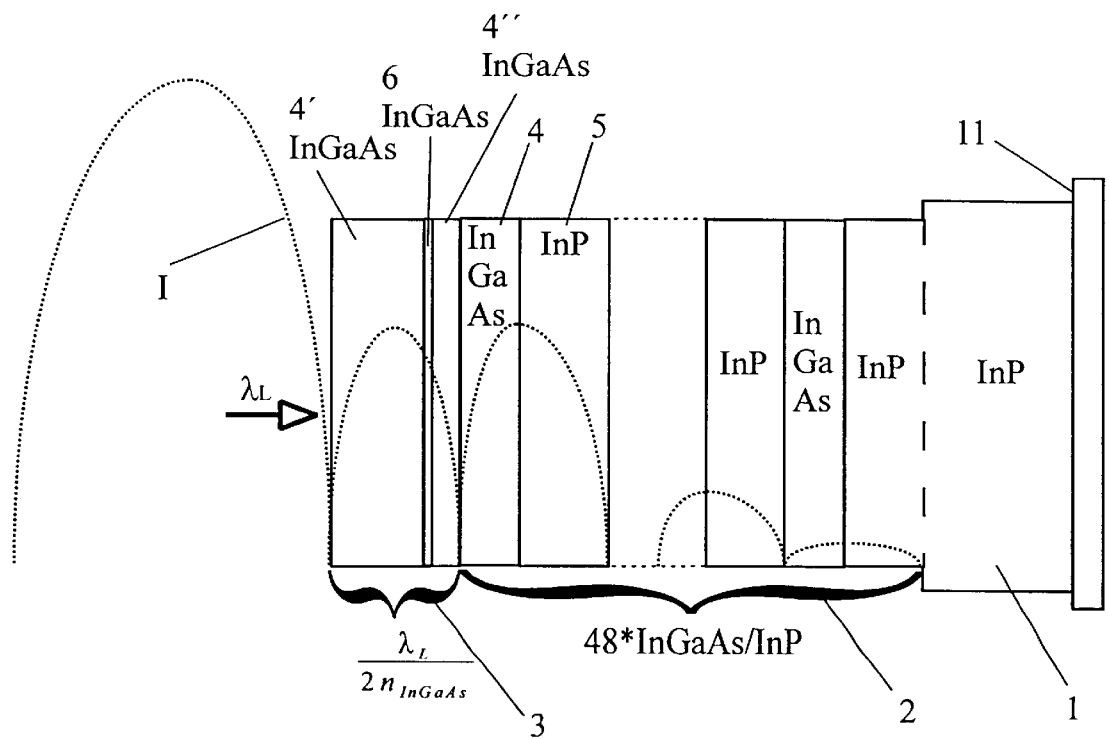
FIG. 6 shows the construction of the resonator mirror with a saturable absorber based on an InGaAs/InP system.

FIG. 6 shows a resonator mirror with a saturable absorber based on a layer system of indium gallium arsenide/indium phosphide which corresponds to the system in FIG. 1. The single quantum layer 6 is embedded in the high-index indium gallium arsenide layers (4' and 4") in this case. In connection with the Bragg reflector which is arranged downstream viewed in the direction of the laser radiation, there is an intensity distribution I as shown by the dotted line in FIG. 4. This construction functions only for laser wavelengths $\lambda_L > 1.65$ μm because $In_{0.53}Ga_{0.47}As$ is not transparent for shorter wavelengths.

FIG. 6 shows a heat sink 11 which is connected in a thermally conductive manner with the substrate 1. The heat sink is connected with a temperature measuring and controlling device and regulates the heat balance of the reflector with the saturable absorber during its operation in a laser resonator.

Figure 7:
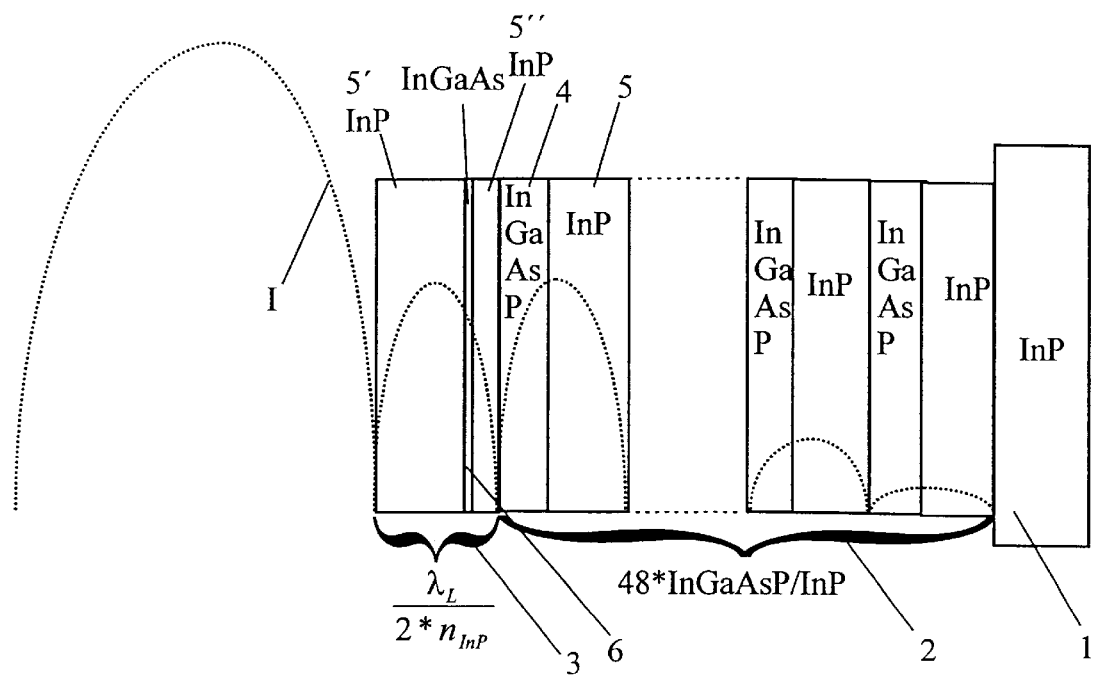
FIG. 7 shows the construction of the resonator mirror with a saturable absorber based on an InGaAsP/InP system.

FIG. 7 shows another resonator mirror by way of example which is constructed on the basis of an indium gallium arsenide phosphide layer system 4 and 5 and is based on the system according to FIG. 2. The single quantum layer 6 is embedded in the low-index indium phosphide layers (5' and 5") in this case. This construction functions for laser wavelengths $\lambda_L > 1.3$ μm depending on the composition of the indium gallium arsenide phosphide ($In_{1-y}Ga_yAs_zP_{1-z}$).

The selection of the layer systems mentioned herein is given by way of example. Depending on the laser wavelength $\lambda_L$, the person skilled in the art can select suitably transparent materials for the Bragg reflector, a material for the single quantum layer with a corresponding band gap and thickness, and the material for the embedding of the single quantum layer, wherein their combination must be carried out so as to form a mechanically and chemically stable layer system which is as homogeneous as possible over the surface and is sufficiently stable with respect to power for the laser wavelength.

While the foregoing description and drawings represent the preferred embodiments of the present invention, it will be obvious to one skilled in the art that various changes and modifications may be made therein without departing from the true spirit and scope of the present invention.

What is claimed is:

1. A resonator mirror with a saturable absorber for use in a solid-state laser resonator, said laser resonator having an output power greater than 1W and being adapted for a laser radiation having wavelength $\lambda_L$ comprising:
   a substrate on which a series of layers of a plurality of semiconductor layers is formed;
   said series of layers including a Bragg reflector formed of a plurality of alternately arranged layers comprising a first material with an index of refraction $n_H$ and a second material with a lower index of refraction $n_L$ compared with the latter grown on a surface of the substrate; and
   a threefold layer being grown directly on the Bragg reflector, wherein a single quantum layer is embedded within two layers of the first material or within two layers of the second material and outside an intensity minimum for the laser radiation within said laser resonator and said threefold layer has a combined optical thickness that is a whole-number multiple i of $$\frac{\lambda_L}{2}$$

wherein an anti-reflection coating is applied to the threefold layer and is designed for the laser wavelength $\lambda_L$.

2. The resonator mirror according to claim 1, wherein the selected value of i is one of 1, 2, and 3.

3. The resonator mirror according to claim 1, wherein the absorption behavior of the resonator mirror is adjusted by the selection of thickness ($d_3$) and position of the single quantum layer between said two layers, wherein one of the two layers ($d_1$ or $d_2$) has a minimum thickness of $$\frac{\lambda_L}{100}.$$

4. The resonator mirror according to claim 1, wherein the single quantum layer is arranged outside an intensity maximum of the laser radiation.

5. The resonator mirror according to claim 1, wherein the single quantum layer is a low-temperature layer, particularly comprising one of the following material systems: indium gallium arsenide (InGaAs) or gallium arsenide antimony (GaAsSb) or gallium nitrogen arsenide (GaNAs).

6. The resonator mirror according to claim 1, wherein the threefold layer has a thickness of $$\frac{\lambda_L}{2*n_H} \text{ or } \frac{\lambda_L}{2*n_L}.$$

7. The resonator mirror according to claim 6, wherein the substrate is made of gallium arsenide (GaAs) and the Bragg reflector comprises individual layers, each of which has a thickness of $$\frac{\lambda_L}{4*n_{GaAs}}$$

for the first material with the refractive index $n_H$ with undoped gallium arsenide (GaAs) and $$\frac{\lambda_L}{4*n_{AlAs}}$$

for the second material with the lower refractive index $n_L$ with undoped aluminum arsenide (AlAs).

8. The resonator mirror according to claim 7, wherein the single quantum layer is embedded in gallium arsenide.

9. The resonator mirror according to claim 6, wherein the substrate is formed of indium phosphide (InP) and the Bragg reflector is formed of individual layers, each of which has a thickness of $$\frac{\lambda_L}{4*n_{InGaAs}}$$

for the first material with the refractive index $n_H$ with indium gallium arsenide ($In_{1-y}Ga_yAs$) and $$\frac{\lambda_L}{4*n_{InP}}$$

for the second material with the lower refractive index $n_L$ with indium phosphide (InP).

10. The resonator mirror according to claim 9, wherein the single quantum layer is embedded between two layers of indium gallium arsenide or indium phosphide.

11. The resonator mirror according to claim 6, wherein the substrate comprises indium phosphide (InP) and the Bragg reflector comprises individual layers, each of which has a thickness of $$\frac{\lambda_L}{4*n_{InGaAsP}}$$

for the first material (4) with the refractive index $n_H$ with indium gallium phosphide ($In_{1-y}Ga_yAs_zP_{1-z}$) and $$\frac{\lambda_L}{4*n_{InP}}$$

for the second material with the lower refractive index $n_L$ with indium phosphide (InP).

12. The resonator mirror according to claim 11, wherein the single quantum layer is embedded between two layers of indium gallium arsenide phosphide or indium phosphide.

13. The resonator mirror according to claim 7, wherein the single quantum layer comprises indium gallium arsenide ($In_{1-x}Ga_xAs$), wherein its layer thickness and composition (x) are determined by the laser wavelength $\lambda_L$.

14. The resonator mirror according to claim 9, wherein the single quantum layer comprises indium gallium arsenide ($In_{1-x}Ga_xAs$), wherein its layer thickness and composition (x) are determined by the laser wavelength $\lambda_L$.

15. The resonator mirror according to claim 11, wherein the single quantum layer comprises indium gallium arsenide ($In_{1-x}Ga_xAs$), wherein its layer thickness and composition (x) are determined by-the laser wavelength $\lambda_L$.

16. The resonator mirror according to claim 1, wherein the substrate is connected in a thermally conductive manner with a heat sink whose reference temperature can be adjusted and regulated.

17. Solid-state laser resonator having a resonator mirror with a saturable absorber and being adapted for a laser radiation having a wavelength $\lambda_L$, said resonator mirror comprising:

a substrate on which a series of layers of a plurality of semiconductor layers is formed;

said series of layers including a Bragg reflector formed of a plurality of alternatively arranged layers comprising a first material with an index of refraction $n_H$ and a second material with a lower index of refraction $n_H$ compared with the latter grown on a surface of the substrate; and a threefold layer being grown directly on the Bragg reflector, wherein a single quantum layer is embedded within two layers of the first material or between two layers of the second material and outside an intensity minimum for the laser radiation within said laser resonator and said threefold layer has a combined optical thickness that is a whole-number multiple i of $$\frac{\lambda_L}{2}.$$

wherein an anti-reflection coating is applied to the threefold layer and is designed for the laser wavelength $\lambda_L$ and wherein the output power of the laser resonator is greater than 1W.

* * * * *